US011981522B2

(12) United States Patent
Murzynowski et al.

(10) Patent No.: US 11,981,522 B2
(45) Date of Patent: May 14, 2024

(54) SYSTEMS AND METHODS FOR HANDLING A FLEXIBLE WEB

(71) Applicant: Cryovac, LLC, Charlotte, NC (US)

(72) Inventors: Alan Ronald Murzynowski, Grand Island, NY (US); Theodore F. Cyman, Grand Island, NY (US); Daniel Edward Kanfoush, Grand Island, NY (US); Anthony Vincent Moscato, N. Tonawanda, NY (US); Myron Chester Heeb, West Seneca, NY (US); Brett Christopher Rimes, Grand Island, NY (US)

(73) Assignee: Cryovac, LLC, Charlotte, NC (US)

(*) Notice: Subject to any disclaimer, the term of this patent is extended or adjusted under 35 U.S.C. 154(b) by 75 days.

(21) Appl. No.: 17/910,414

(22) PCT Filed: Mar. 11, 2021

(86) PCT No.: PCT/US2021/021816
§ 371 (c)(1),
(2) Date: Sep. 9, 2022

(87) PCT Pub. No.: WO2021/183715
PCT Pub. Date: Sep. 16, 2021

(65) Prior Publication Data

US 2023/0150786 A1 May 18, 2023

Related U.S. Application Data

(60) Provisional application No. 62/988,438, filed on Mar. 12, 2020.

(51) Int. Cl.
*B65H 27/00* (2006.01)
*B41J 3/407* (2006.01)
(Continued)

(52) U.S. Cl.
CPC .............. *B65H 27/00* (2013.01); *B41J 3/407* (2013.01); *B41J 11/0005* (2013.01);
(Continued)

(58) Field of Classification Search
CPC ...... B41J 3/407; B41J 15/04; B41J 2203/011; B65H 2404/13161; B65H 2404/13162; B65H 2515/84; B65H 2801/15
See application file for complete search history.

(56) References Cited

U.S. PATENT DOCUMENTS 3,405,855 A * 10/1968 Daly .......................... D21F 1/36
226/193
6,372,172 B1 4/2002 Sudduth et al.
(Continued)

FOREIGN PATENT DOCUMENTS

CN 101961609 A 2/2011
CN 202378407 U 8/2012
(Continued)

*Primary Examiner* — Henok D Legesse
(74) *Attorney, Agent, or Firm* — Jason R. Womer

(57) ABSTRACT

According to one aspect, a web handling system comprises a plurality of cross-grooved idler rollers, an imaging drum, a nip roller adjacent the imaging drum and forming a nip therewith, and a spreader roller disposed between the plurality of idler rollers and the nip roller. Each idler roller is disposed no more than a first distance from an adjacent idler roller, spreader roller, and nip roller and the spreader roller is disposed no more than a second distance from the nip. The first distance is in a range of 38 to 28 inches, 36 to 30 inches, or 35 to 33 inches and the second distance is in a range of 6 to 11 inches, 6.5 to 9 inches, or 7.0 to 8.5 inches.

17 Claims, 12 Drawing Sheets

(51) Int. Cl.

| | |
|---|---|
| ***B41J 11/00*** | (2006.01) |
| ***B41J 11/04*** | (2006.01) |
| ***B41J 11/42*** | (2006.01) |
| ***B41J 15/04*** | (2006.01) |

(52) U.S. Cl.

CPC ........ *B41J 11/0035* (2013.01); *B41J 11/0095* (2013.01); *B41J 11/04* (2013.01); *B41J 11/42* (2013.01); *B41J 15/04* (2013.01); *B41J 2203/011* (2020.08); *B65H 2404/13161* (2013.01); *B65H 2404/13162* (2013.01); *B65H 2515/84* (2013.01); *B65H 2801/15* (2013.01)

(56) References Cited

U.S. PATENT DOCUMENTS

| | | | |
|---|---|---|---|
| 6,960,275 | B2 | 11/2005 | Vesley et al. |
| 8,052,277 | B2 | 11/2011 | Kim et al. |
| 9,376,582 | B1 | 6/2016 | Dannhauser et al. |
| 9,434,201 | B2 | 9/2016 | Dannhauser et al. |
| 2007/0193692 | A1 | 8/2007 | Arafat et al. |
| 2009/0303276 | A1 | 12/2009 | Van De Wynckel et al. |
| 2013/0300794 | A1 | 11/2013 | Leighton et al. |
| 2014/0290519 | A1 * | 10/2014 | Herrmann ............ B41J 11/0095 101/481 |
| 2015/0232294 | A1 | 8/2015 | Newhouse et al. |

FOREIGN PATENT DOCUMENTS

| | | | |
|---|---|---|---|
| CN | 104960966 | A | 10/2015 |
| CN | 105525531 | A | 4/2016 |
| CN | 208515194 | U | 2/2019 |
| CN | 109484037 | A | 3/2019 |
| CN | 110641162 | A | 1/2020 |
| EP | 0709328 | A2 | 5/1996 |
| WO | 9938699 | A1 | 8/1999 |
| WO | 2016128560 | A2 | 8/2016 |

* cited by examiner

SYSTEMS AND METHODS FOR HANDLING A FLEXIBLE WEB

CROSS-REFERENCE TO RELATED APPLICATIONS

This application claims priority to U.S. Patent Application Ser. No. 62/988,438, filed Mar. 12, 2020 and entitled "Systems and Methods For Handling A Flexible Web," the entirety of which is incorporated herein by reference.

BACKGROUND

The subject matter disclosed herein relates to web handling systems and methods, and more particularly to systems and methods for handling a flexible web that is being printed.

High speed printing systems have been developed for printing on a substrate, such as a web of shrinkable polymeric film. Such a material typically exhibits both elasticity and plasticity characteristics that depend upon one or more applied influences, such as force, heat, chemicals, electromagnetic radiation, etc. These characteristics must be carefully taken into account during the system design process because it may be necessary: 1.) to control material shrinkage during imaging so that the resulting imaged film may be subsequently used in a shrink-wrap process, and 2.) to avoid system control problems by minimizing dynamic interactions between system components due to the elastic deformability of the substrate.

Also, a flexible web is subject to the formation of wrinkles therein, resulting in poor or even unacceptable print quality. A further issue is encountered in a print system using ink jet printheads to apply inks to a flexible web. A splice or wrinkle passing an ink jet printer during high speed production can damage one or more of the printheads of the printer, resulting in expensive downtime and the need to replace the damaged printheads, entailing significant replacement costs.

The discussion above is merely provided for general background information and is not intended to be used as an aid in determining the scope of the claimed subject matter.

BRIEF DESCRIPTION

According to one aspect, a web handling system comprises a plurality of cross-grooved idler rollers, an imaging drum, a nip roller adjacent the imaging drum and forming a nip therewith, and a spreader roller disposed between the plurality of idler rollers and the nip roller. Each idler roller is disposed no more than a first distance from an adjacent idler roller, spreader roller, and nip roller and the spreader roller is disposed no more than a second distance from the nip. The first distance is in a range of 38 to 28 inches, 36 to 30 inches, or 35 to 33 inches and the second distance is in a range of 6 to 11 inches, 6.5 to 9 inches, or 7.0 to 8.5 inches.

According to another aspect, a web handling system comprises a plurality of cross-grooved idler rollers comprising a first set of idler rollers and a second set of idler rollers, an imaging drum, a nip roller adjacent the imaging drum and forming a nip therewith, at least one printhead adjacent the imaging drum and movable with respect to the imaging drum, and a spreader roller disposed between the first set of idler rollers and the nip roller. The second set of idler rollers is disposed at a downstream location from the imaging drum, each idler roller is disposed no more than 36 inches from an adjacent idler roller, spreader roller, and nip roller, and the spreader roller is disposed no more than 9 inches from the nip. At least one sensor is adapted to detect web thickness and a control system is responsive to the at least one sensor and adapted to move the at least one printhead.

According to yet another aspect, a web handling system for handling web material comprises a plurality of cross-grooved idler rollers, an imaging drum, a grooved nip roller adjacent the imaging drum and forming a nip therewith, at least one printhead adjacent the imaging drum and movable with respect to the imaging drum, and a spreader roller disposed between the idler rollers and the nip roller. A control system is responsive to detection of one or more of a splice and a wrinkle in the web and adapted to move the at least one printhead to a position away from the imaging drum to avoid contact of the web with the printhead.

According to a still further aspect, a web handling method comprises the step of providing a web system comprising a plurality of cross-grooved idler rollers, an imaging drum, a nip roller adjacent the imaging drum and forming a nip therewith, and a spreader roller disposed between the plurality of cross-grooved idler rollers and the nip roller. The method further includes the steps of disposing each idler roller, spreader roller, and nip roller no more than a first distance from an adjacent idler roller, spreader roller, or nip roller wherein the first distance is in a range of 38 to 28 inches, 36 to 30 inches, or 35 to 33 inches, disposing the spreader roller no more than a second distance from the nip the second distance is in a range of 6 to 11 inches, 6.5 to 9 inches, or 7.0 to 8.5 inches, and transporting a flexible web through the web system.

According to yet another aspect, a web handling method comprises the step of providing a web system comprising a plurality of cross-grooved idler rollers comprising a first set of idler rollers and a second set of idler rollers, an imaging drum, a nip roller adjacent the imaging drum and forming a nip therewith, at least one printhead adjacent the imaging drum and movable with respect to the imaging drum, and a spreader roller disposed between the first set of idler rollers and the nip roller. The method further includes the steps of disposing the second set of idler rollers at a downstream location from the imaging drum, disposing each idler roller no more than 36 inches from an adjacent idler roller, spreader roller, and nip roller, and disposing the spreader roller no more than 9 inches from the nip. Still further, the method includes the steps of transporting a flexible web through the web system, detecting web thickness, and operating a control system to move the at least one printhead responsive to the detected web thickness.

According to a still further aspect, a web handling method comprises the step of providing a web handling system comprising a plurality of cross-grooved idler rollers, an imaging drum, a grooved nip roller adjacent the imaging drum and forming a nip therewith, at least one printhead adjacent the imaging drum and movable with respect to the imaging drum, and a spreader roller disposed between the idler rollers and the nip roller. The method further includes the steps of transporting a flexible web through the web handling system and operating a control system responsive to detection of one or more of a splice and a wrinkle in the flexible web to move the at least one printhead to a position away from the imaging drum to avoid contact of the web with the printhead.

Other aspects and advantages will become apparent upon consideration of the following detailed description and the attached drawings wherein like numerals designate like structures throughout the specification.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION

Figure 1:
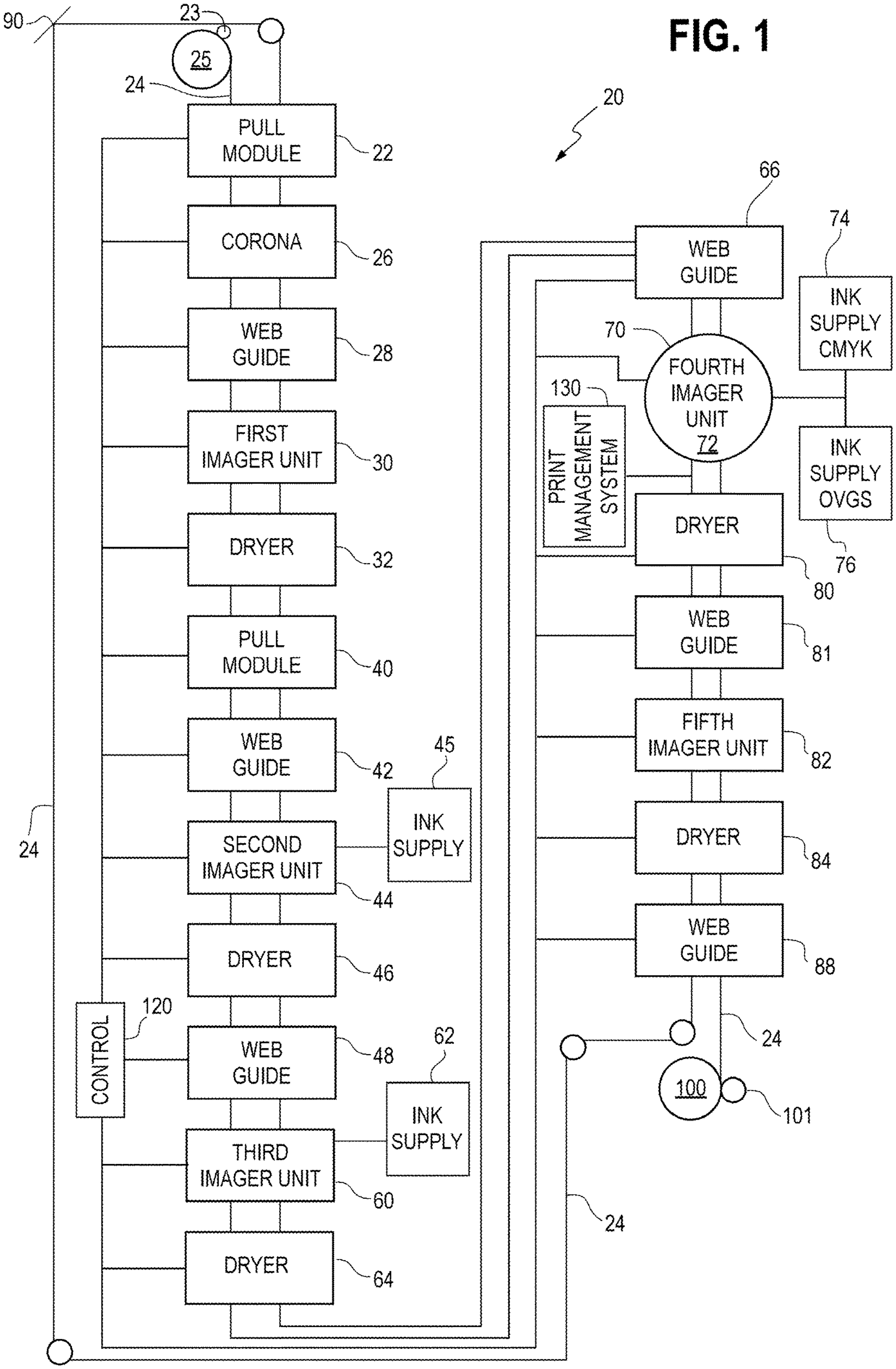
FIG. 1 is a simplified block diagram of an exemplary system for printing images and/or text on a substrate.

FIG. 1 shows an exemplary system 20 for printing content (e.g., images and/or text) on a substrate, such as a shrinkable plastic film used in food grade applications. It should be understood, however, that the system 20 may be used to print on any polymer or other flexible material that is dimensionally stable or unstable during processing for any application, e.g., other than food grade. The system 20 preferably operates at high-speed, e.g., on the order of zero to about 500 or more feet per minute (fpm) and even up to about 1000 fpm, although the system may be operable at a different speed, as necessary or desirable. The illustrated system 20 is capable of printing images and/or text on both sides of a substrate (i.e., the system 20 is capable of duplex printing) although this need not be the case. In the illustrated embodiment, a first side of a substrate is imaged by a sequence of particular units during a first pass, the substrate is then turned over and the other side of the substrate is imaged by all of the particular units or only by a subset of the particular units during a second pass. First portions of one or more of the particular units may be operable during the first pass and second portions of one or more of the particular units laterally offset from the first portions may be operable during the second pass. Also, one or more of the particular units may be capable of simultaneously treating and/or imaging both sides of the substrate during one pass, in which case such unit(s) need not be operable during the other pass of the substrate. In the illustrated embodiment, the first portions are equal in lateral extent to the second portions, although this is not necessarily the case. Thus, for example, the system may have a 52 inch width, and may be capable of duplex printing up to a 26 inch wide substrate. Alternatively, a 52 inch wide (or smaller) substrate may be printed on a single side (i.e., simplex printed) during a single production run. If desired, additional imager units and associated dryer and web guide units may be added in line with the disclosed imager units and other units so as to obtain full-width (i.e., 52 inch in the disclosed embodiment) duplex printing capability. Still further, a substrate having a different width, such as 64 inches (or larger or smaller width) may be accommodated.

Further, the illustrated system 20 may comprise a fully digital system that solely utilizes ink jet printers, although other printing methodologies may be utilized to image one or more layers, such as flexographic printing, lithographic offset printing, silk screen printing, intaglio printing, letterpress printing, etc. Ink jet technology offers drop on demand capability, and thus, among other advantages, allows high levels of color control and image customization.

In addition to the foregoing, certain ink jet heads are suitable to apply the high opacity base ink(s) that may be necessary so that other inks printed thereon can receive enough reflected white light (for example) so that the overprinted inks can adequately perform their filtering function. Some printhead technologies are more suitable for flood coating printing, like printing overcoat varnish, primers, and white, and metallic inks.

On the other hand, printing high fidelity images with high resolution printheads achieves the best quality. Using drum technology and printing with ink jet is the preferred way to maintain registration, control a flexible/shrinkable film substrate, and reproduce an extended gamut color pallet.

The system disclosed herein has the capability to print an extended gamut image. In some cases the color reproduction required may need a custom spot color to match the color exactly. In these cases, an extra eighth channel (and additional channels, if required) can be used to print custom color(s) in synchronization with the other processes in the system.

Printing on flexible/shrinkable films with water-based inks has many challenges and require fluid management, temperature control, and closed loop processes. Thus, in the present system, for example, the ability to maintain a high quality color gamut at high speed is further process controlled by sensor(s) that may comprise one or more calibration cameras to fine tune the system continually over the length of large runs.

As used herein, the phrase "heat-shrinkable" is used with reference to films which exhibit a total free shrink (i.e., the sum of the free shrink in both the machine and transverse directions) of at least 10% at 185° F., as measured by ASTM D2732, which is hereby incorporated, in its entirety, by reference thereto. All films exhibiting a total free shrink of less than 10% at 185° F. are herein designated as being non-heat-shrinkable. The heat-shrinkable film can have a total free shrink at 185° F. of at least 15%, or at least 20%, or at least 30%, or at least 40%, or at least 45%, or at least 50%, or at least 55%, or at least 60%, or at least 65%, or at least 70%, as measured by ASTM D2732. Heat shrinkability can be achieved by carrying out orientation in the solid state (i.e., at a temperature below the glass transition temperature of the polymer). The total orientation factor employed (i.e., stretching in the transverse direction and drawing in the machine direction) can be any desired factor, such as at least 2×, at least 3×, at least 4×, at least 5×, at least 6×, at least 7×, at least 8×, at least 9×, at least 10×, at least 16×, or from 1.5× to 20×, from 2× to 16×, from 3× to 12×, or from 4× to 9×.

Figure 2:
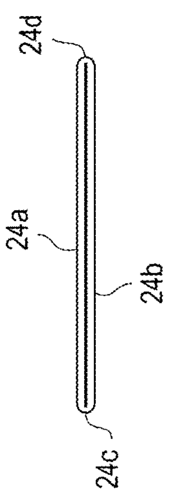
FIG. 2 is an end elevational view of a polymeric film to be imaged by the system of FIG. 1.

As shown in FIG. 1, the illustrated system 20 includes a first pull module 22 that unwinds a web of plastic web 24 from a roll 25 that is engaged by a nip roller 23 at the beginning of a first printing pass through the system 20. The web 24 may comprise a flattened cylinder or tube of plastic film comprising two layers having sides 24*a*, 24*b* (see FIG. 2) joined at side folds 24*c*, 24*d*, although the web 24 may instead simply comprise a single layer of material, if desired and as referred to above. Once unwound by the module 22, the web 24 may be processed by a surface energy modification system, such as a corona treatment unit 26 of conventional type, that increases the surface energy of the web 24. The corona treatment addresses an imaging condition that may be encountered when a large number of closely spaced drops are applied to a low surface energy impermeable material, which, if not compensated for, can result in positional distortion of the applied inks due to coalescence effects. The corona treatment module may be capable of treating both sides of the web 24 simultaneously. A first web guide 28 of conventional type that controls the lateral position of the web 24 in a closed-loop manner then guides the corona-treated web 24 a first imager unit 30. A first dryer unit 32 is operated to dry the material that is applied to the web 24 by the first imager unit 30. The material applied by the first imager unit 30 may be deposited over the entirety of the web 24 or may be selectively applied only to some or all areas that will later receive ink.

A second pull module 40 and a second web guide 42 (wherein the latter may be identical to the first web guide 28) deliver the web 24 to a second imager unit 44 that prints a material supplied by a first supply unit 45 on the web 24. A second dryer unit 46 is operable to dry the material applied by the second imager unit 44.

Thereafter, the web 24 is guided by a third web guide 48 (again, which may be identical to the first web guide 28) to a third imager unit 60 that applies material supplied by a second supply unit 62 thereon, such as at a location at least partially covering the material that was deposited by the second imager unit 44. A third dryer unit 64 is operable to dry the material applied by the third imager unit 60 and the web 24 is then guided by a fourth web guide 66 (that also may be identical to the first web guide 28) to a fourth imager unit 70 comprising a relatively high resolution, extended color gamut imager unit 70.

The imager unit 70 includes a drum 72 around which are arranged ink jet printheads for applying primary process color inks CMYK to the web 24 along with secondary process color inks orange, violet, and green OVG and an optional spot color ink S to the web 24 at a relatively high resolution, such as 1200 dpi and at a high speed (e.g., 100-500 fpm). The extended gamut printing is calibrated at the high printing speed. The drop sizes thus applied are relatively small (on the order of 3-6 pL). If desired, the imager unit 70 may operate at a different resolution and/or apply different drop sizes. The inks are supplied by third and fourth supply units 74, 76, respectively, and, in some embodiments, the inks are of the water-based type. The process colors comprising the CMYK and OVG inks enable reproduction of extended gamut detailed images and high quality graphics on the web 24. A fourth dryer unit 80 is disposed downstream of the fourth imager unit 70 and dries the inks applied thereby.

Following imaging, the web 24 may be guided by a web guide 81 (preferably identical to the first web guide 28) and coated by a fifth imager unit 82 comprising an ink jet printer operating at a relatively low resolution and large drop size (e.g., 600 dpi, 5-12 pL size drops) to apply an overcoat, such as varnish, to the imaged portions of the web 24. The overcoat is dried by a fifth dryer unit 84. Thereafter, the web is guided by a web guide 88 (also preferably identical to the first web guide 28), turned over by a web turn bar 90, which may comprise a known air bar, and returned to the first pull module 22 to initiate a second pass through the system 20, following which material deposition/imaging on the second side of the web 24 may be undertaken, for example, as described above. The fully imaged web 24 is then stored on a take-up roll 100 engaged by a nip roll 101 and thereafter may be further processed, for example, to create shrink-wrap bags.

While the web 24 is shown in FIG. 1 as being returned to first the pull module 22 at the initiation of the second pass, it may be noted that the web may be instead delivered to another point in the system 20, such as the web guide 28, the first imager unit 30, the pull module 40, the web guide 42, or the imager unit 44 (e.g., when the web 24 is not to be pre-coated), bypassing front end units and/or modules, such as the module 22 and the corona treatment unit 26.

Further, in the case that the web 24 is to be simplex printed (i.e., on only one side) the printed web 24 may be stored on the take-up roll 100 immediately following the first pass through the system 20, thereby omitting the second pass entirely.

The web 24 may be multilayer and may have a thickness of 0.25 mm or less, or a thickness of from 0.5 to 30 mils, or from 0.5 to 15 mils, or from 1 to 10 mils, or from 1 to 8 mils, or from 1.1 to 7 mils, or from 1.2 to 6 mils, or from 1.3 to 5 mils, or from 1.5 to 4 mils, or from 1.6 to 3.5 mils, or from 1.8 to 3.3 mils, or from 2 to 3 mils, or from 1.5 to 4 mils, or from 0.5 to 1.5 mils, or from 1 to 1.5 mils, or from 0.7 to 1.3 mils, or from 0.8 to 1.2 mils, or from 0.9 to 1.1 mils. The web 24 may have a film percent transparency (also referred to herein as film clarity) measured in accordance with ASTM D 1746-97 "Standard Test Method for Transparency of Plastic Sheeting", published April, 1998, which is hereby incorporated, in its entirety, of at least 15 percent, or at least 20 percent, or at least 25 percent, or at least 30 percent.

Preferably, the system 20 includes a first tension zone between the roll 25 (which is a driven roll) and the pull module 22, a second tension zone between the pull module 22 and the imager unit 30, a third tension unit between the imager unit 30 and the pull module 40, a fourth tension zone between the pull module 40 and the imager unit 44, a fifth tension zone between the imager unit 44 and the imager unit 60, a sixth tension zone between the imager unit 60 and the drum 72, a seventh tension zone between the drum 72 and the imager unit 82, and an eighth tension zone between the imager unit 82 and the take-up roll 100 (which is a driven roll). One or more tension zones may be disposed between the imager unit 82 and the pull module 22 and/or at other points in the system 20. Each of the elements defining the ends of the tension zones comprises, for example, a driven roll (which, in the case of the imager units 30, 44 60, 70, and 82, comprise imager drums) with a nip roller as described in greater detail hereinafter. Preferably, all of the tension zones are limited to about 20 feet or less in length. The web tension in each tension zone is controlled by one or more tension controllers such that the web tension does not fall outside of predetermined range(s).

The nature and design of the first, second, and third imager units 30, may vary with the printing methodologies that are to be used in the system 20. For example, in a particular embodiment in which a combination of flexographic and ink jet reproduction is used, then the first imager unit 30 may apply a composition comprising a clear primer and a dispersion of a white colorant, such as titanium dioxide, in a flood-coated fashion to the web 24. The second imager unit 44, which may comprise an ink jet printer or a flexographic unit, may thereafter deposit one or more metallic ink(s) onto the web at least in portions that received material from the first imager unit 30. In such an embodiment, the third imager unit 60 is not required, and the imager unit 60 and dryer unit 64 and web guide 66 associated therewith may be omitted.

In a further embodiment, the first imager unit 30 comprises a flexographic unit that applies a white pigmented ink to the web 24, the second imager unit 44 comprises an ink jet printer or a flexographic unit that applies one or more metallic inks, and the third imager unit 60 comprises an ink jet printer or flexographic unit that applies a clear primer to the web 24.

In yet another embodiment that uses ink jet technology throughout the system 20, the first imager unit 30 comprising an ink jet printer may apply a composition comprising a clear primer and a dispersion of a white colorant, such as titanium dioxide, to the web 24. The second imager unit 44, which comprises an ink jet printer, may thereafter deposit one or more metallic ink(s) onto the web at least in portions that received material from the first imager unit 30. In such an embodiment, the third imager unit 60 is not required, and the imager unit 60 and dryer unit 64 and web guide 66 associated therewith may be omitted.

In a still further embodiment, the first imager unit 30 comprises an ink jet printer that applies a white pigmented ink to the web 24, the second imager unit 44 comprises an ink jet printer that applies one or more metallic inks, and the third imager unit 60 comprises an ink jet printer that applies a clear primer to the web 24.

Any one or more of the imager units 30, 44, 60, 70, and 82 may be omitted or the functionality thereof may be combined with one or more other imager units. Thus, for example, in the case where a combined primer and white pigmented material are applied, the combination may be printed by one of the imager units 30 or 44 and the other of the imager units 30, 44 may be omitted.

In some embodiments each of the first, second, and third imager units 30, 44, 60 comprises a 600 dpi (dots per inch) inkjet printer that applies relatively large drops (i.e., at least 5-12 picoliters (pL)) each using piezoelectric ink jet heads, although the imager units 30, 44, and/or 60 may operate at a different resolution and/or apply different sizes of drops. Thus, for example, a printhead designed for use with metallic and precoating inks in the present system may have a resolution of 400 dpi and drop volume of 20-30 pL. The pre-coating material, white, and metallic inks have relatively heavy pigment loading and/or large particle sizes that are best applied by the relatively low resolution/large drop size heads of the imager units 30, 44, 60.

In alternative embodiments, one or more of the primer, white, and coating imager units may operate at a relatively high resolution and/or small drop size, such as 1200 dpi/3-6 pL.

The primer renders at least a portion of the surface of the web 24 suitable to receive later-applied water-based inks. It is preferable (although not necessary) to apply the primer just before the process and spot color inks are applied by the fourth imager unit 70 so that the such colors are directly applied to the dried primer.

Preferably, the fourth imager unit 70 comprises the above-described ink jet printer so that drop-on-demand technology may be taken advantage of, particularly with respect to print-to-print variability, high resolution, and the ability to control registration precisely.

The fifth imager unit 82 also preferably comprises an ink jet printer that operates at least at 1200 dpi or 2400 dpi, although it may instead be implemented by a different printing methodology, such as a flexographic unit.

As noted in greater detail hereinafter, a supervisory or global control system 120 is responsive to sensors (not shown in FIG. 1) and is responsible for overall closed-loop control of various system devices during a production run. A further control system comprising a print management control system 130 controls the various imager units also in a closed-loop fashion to control image reproduction as well as color correction, registration, correct for missing pixels, etc.

Also in the illustrated embodiment, each dryer unit 32, 46, 64, 80, and 84 is controlled by an associated closed-loop dryer management system (not shown in FIG. 1) during printing to, among other things, minimize image offsetting (sometimes referred to as "pick-off"), which can result in artifacts that may result from improper or insufficient drying of ink deposited on the web causing undried ink/coating to adhere (i.e., offset) to one or more system handling components, such as idler roller(s) or other component(s), and be transferred from such system handling component(s) to other portions of the web.

In the case of a partially or completely ink jet implemented system, the printheads used by the first through fifth imager units 30, 44, 60, 70, and/or 82 may be of the same or different types, even within each printer, and/or, as noted previously, different printing methodologies could be used to apply inks/coatings. In any event, the global control system 120 and/or the print management control system 130 is (are) programmed to convert input data representing the various layers, such as data in a print-ready source format (e.g., Adobe Portable Document Format or PDF) to bitmaps by a ripping process or other page representation(s) during pre-processing taking into account the operational characteristics of the various printhead types/printing methodologies (such as the resolution(s) and drop size(s) to be deposited) and properties of the web (such as shrinkage when exposed to heat).

In addition to the foregoing, one or more additional control systems may be provided, for example, to track and control the web 24 as the web 24 is conveyed through the system 20 and as described further hereinafter. The various control systems may be implemented together or separately by one or more suitable programmable devices, input sensors, and output control devices, as appropriate or desirable.

Figure 3:
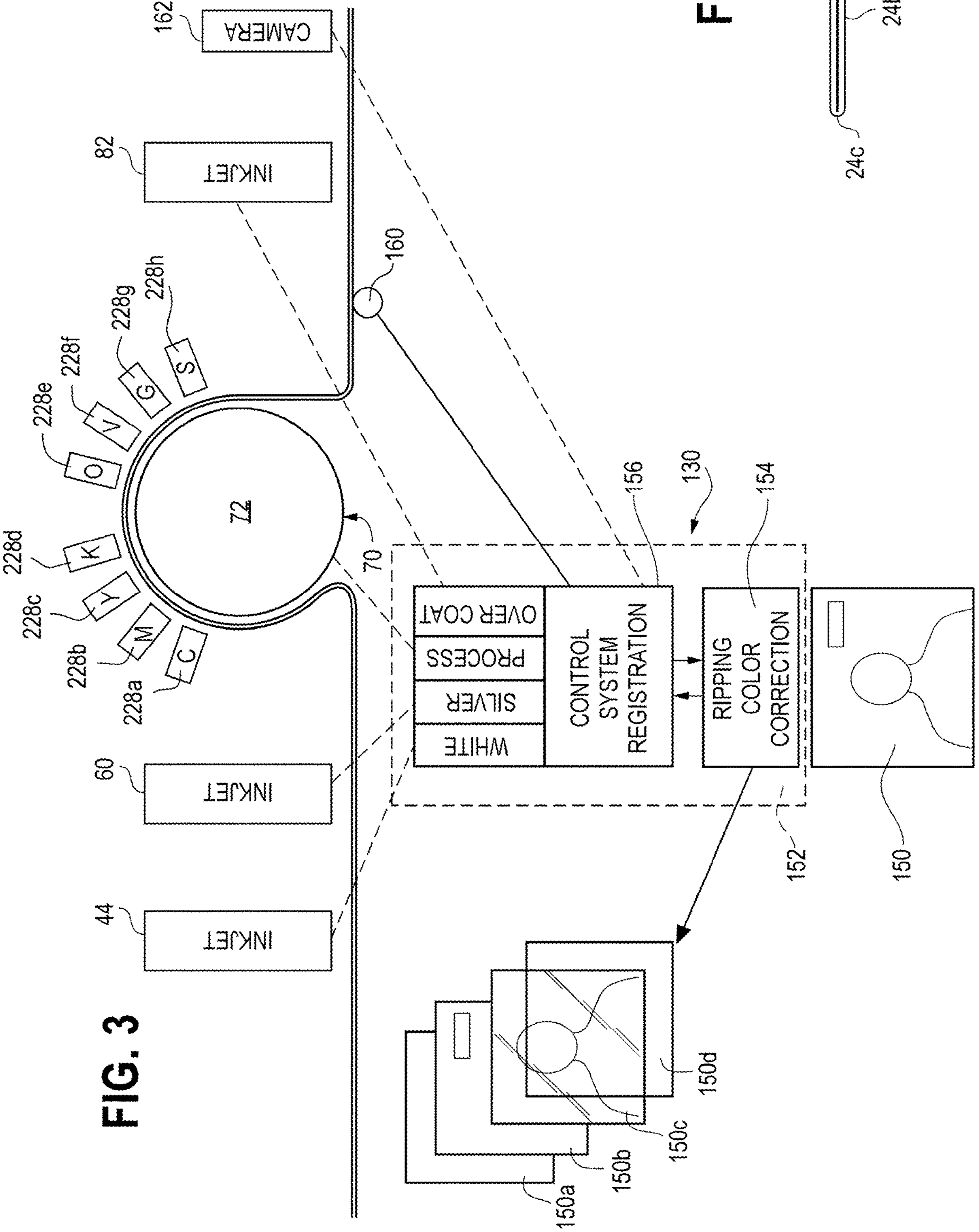
FIG. 3 is a simplified functional block diagram of the print management system of FIG. 1.

Referring next to FIG. 3, an exemplary embodiment of the print management control system 130 is illustrated in generalized form, it being assumed that the first imager unit 30 applies pre-coating material over a selected portion of or over the entire web 24 so that control of such imager unit 30 is straightforward and therefore not illustrated. The exemplary print management control system 130 takes in pages 150 in a print-ready format, such as PDF or another print-ready or non-print-ready format, and divides each page into data representing layers that are to be imaged by the imager units 44, 60, 70, and 82. More particularly, using the illustrated page 150 as an example, a processing unit 152 divides the data defining the page 150 into layer data representing four layers 150*a*, 150*b*, 150*c*, and 150*d* to be printed in white, silver, process colors (with an optional spot color), and overcoat, respectively, color corrects the layer data as needed taking into account the particular inks and web material, and converts the color corrected layer data into four layer bitmaps using a raster image processing (RIP) technique (block 154). The processing unit 152 then determines registration parameters that are used in conjunction with the layer bitmaps to control the individual imager units 44, 60, 70, and 82 (block 156) such that the layer images are accurately printed atop one another on the web 24.

The processing unit 152, which may comprise a suitably programmed computer or server or other programmable device, is responsive to feedback signals developed by sensors including a position encoder 160 and, optionally, a camera 162 that sense web position and the printed image so that the processing unit 152 and/or other controls can operate in a closed-loop manner during start up, shutdown and steady state operation.

It has been found that digitally imaging heat shrinkable extensible tube material presents web handling issues due to the risk of printhead damage from wrinkles and splices that are not a risk for normal flexographic imaging processes. Wrinkles in extensible film webs can be formed in several ways: 1.) air trapped in the web 24 forms pockets due to smooth nip points and the pockets wrap over solid idler rollers that inadvertently burst the air pockets during web movement and deform the material surface; 2.) the distance between contact points may be excessive, thereby allowing the material to fold onto itself; 3.) the alignment tolerances between contact rollers may be inadequately controlled, leading to wrinkle formation; and 4.) standard tension control methods are typically not sufficiently precisely controllable to avoid wrinkling.

Figure 4:
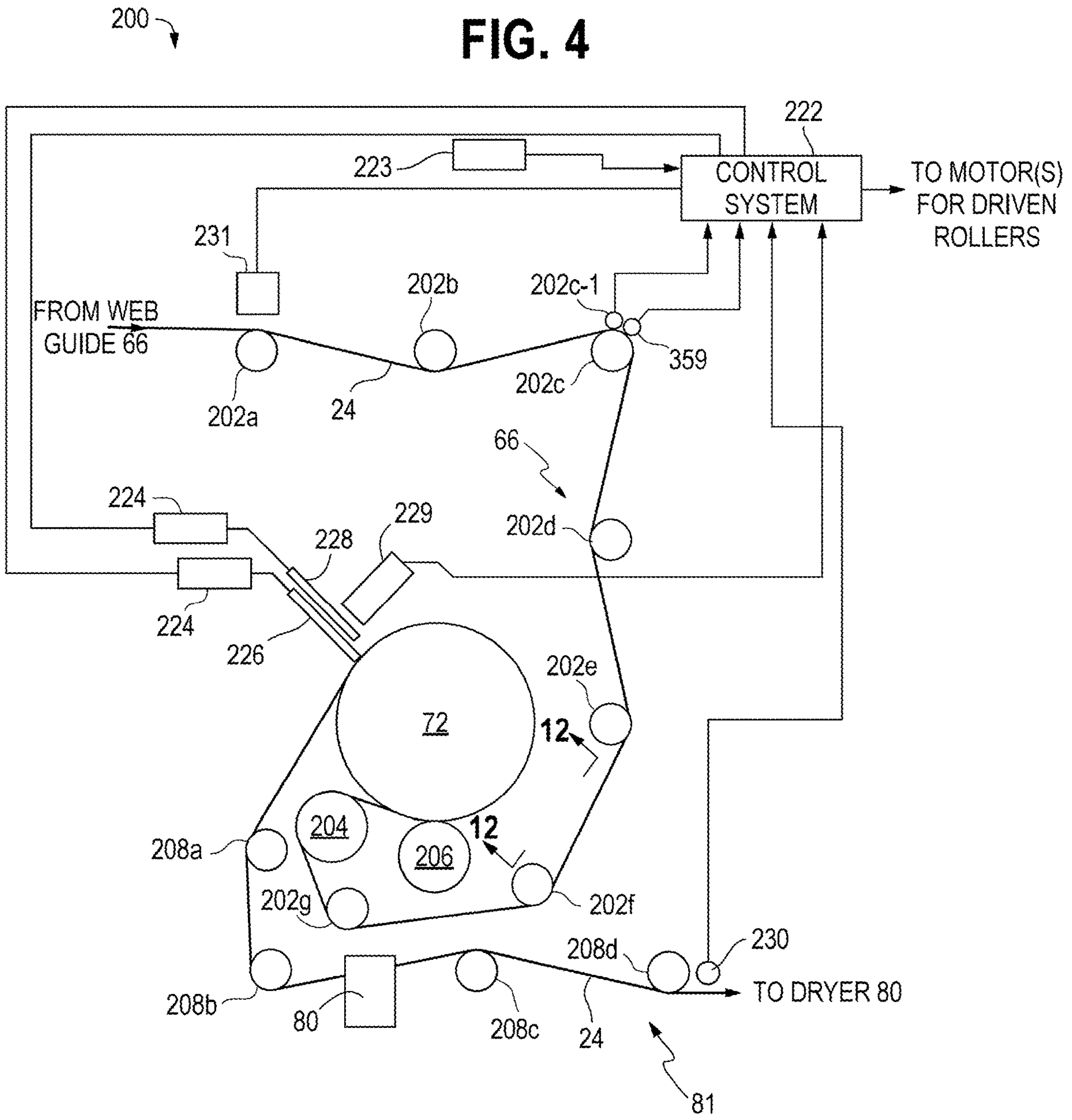
FIG. 4 is a combined diagrammatic view and block diagram of an exemplary embodiment of the fourth imager unit of FIG. 1 illustrating web rotatable devices and a control system.

In order to address these issues a web handling system 200, a portion of which is shown in FIG. 4, manages the travel of the web 24 to and from the fourth imager unit 70, for example. (It should be noted that the fourth imager unit 70 is inverted front-to-back as compared to the showing thereof in FIG. 3). Similar and/or identical components may be used to control the movement of the web at other portions of the system 20, as described in greater detail hereinafter.

The web handling system 200 comprises journaled infeed idler rollers 202*a*-202*g*, a journaled spreader roller 204, a journaled nip roller 206 disposed adjacent the drum 72, and journaled outfeed idler rollers 208*a*-208*d*. It should be noted that a greater or lesser number of rollers may instead be used to transport the web 24, as necessary or desirable.

Figure 5:
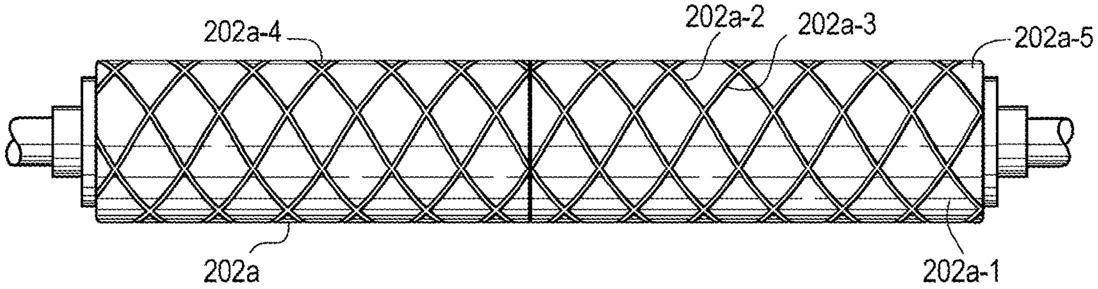
FIG. 5 is a side elevational view of an idler roller used in the embodiment of FIG. 4.
Figure 6:
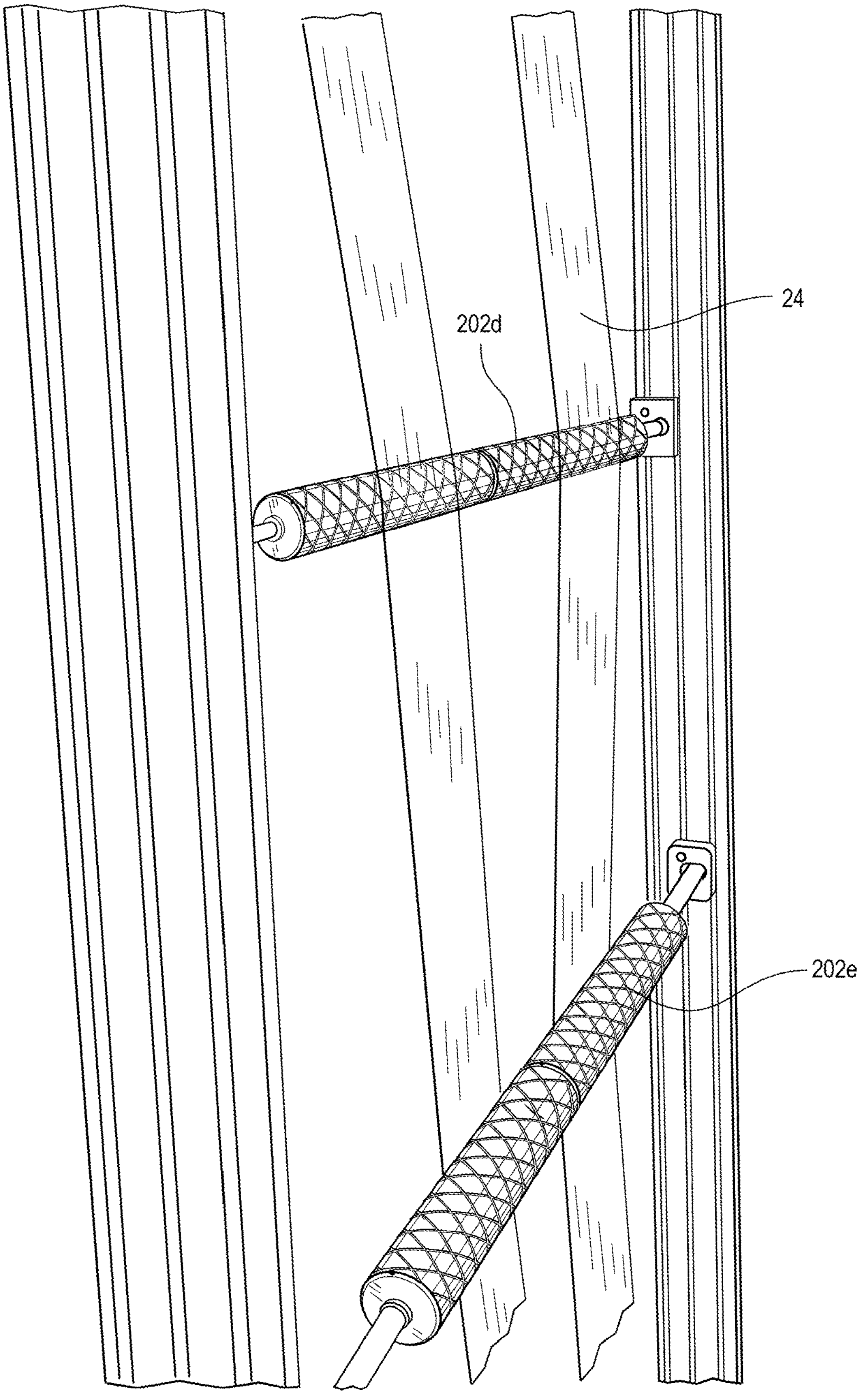
FIG. 6 is a fragmentary perspective side view of the rollers 202*d* and 202*e* of FIG. 4.
Figure 10:
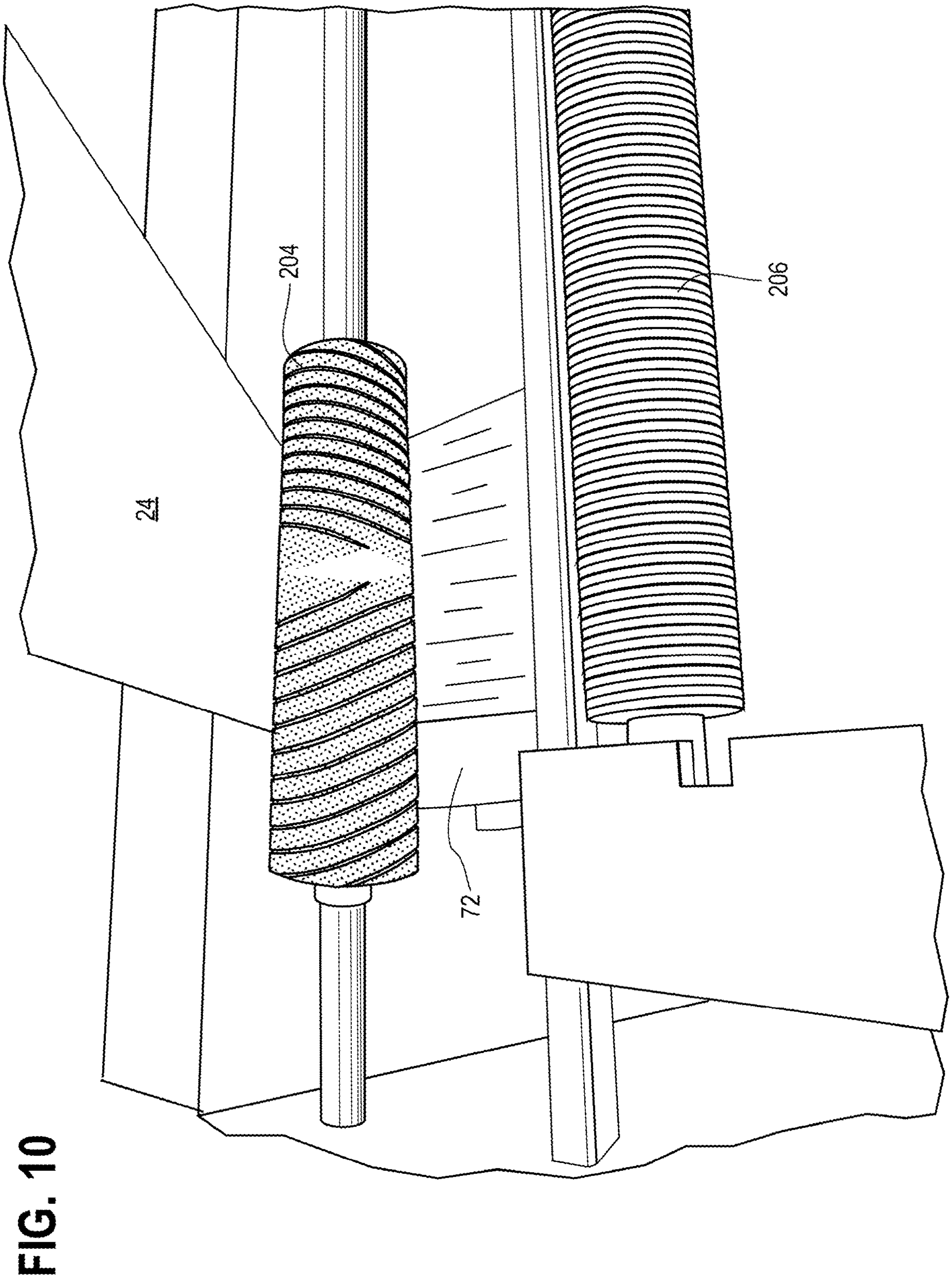
FIG. 10 is fragmentary side perspective view of the spreader roller 204, nip roller 206, and drum 72 of FIG. 4.

Referring to FIGS. 5, 6, and 10, in the illustrated embodiment the idler rollers 202 and 208 are identical to one another and each of the idler rollers 202, 208 is fabricated of a metal or other material. Referring specifically to FIG. 5, the idler roller 202*a* comprises a cylindrical surface 202*a*-1 and diagonally-extending grooves 202*a*-2 and 202*a*-3 that cross one another, preferably, but not necessarily, at right angles. The grooves 202*a*-2 and 202*a*-3 are all identical to one another Each of the idler rollers 202, 208, such as the idler roller 202*a*, preferably comprises two independently journaled (i.e., split) portions comprising halves 202*a*-4 and 202*a*-5 that are separated by a small distance, such as one-ten thousandths of an inch, so that the halves 202*a*-4 and 202*a*-5 can rotate in response to the passage of, for example, a 52 inch web thereover, or can rotate independently at different speeds in response to the passage of, for example, two 26 inch webs thereover. Preferably, each of the grooves 202*a*-2 and 202*a*-3 of each portion 202*a*-4 and 202*a*-5 has a V-shape or a U-shape that extends continuously from one axial end of each roller portion 202*a*-4 and 202*a*-5 to the other axial end of the roller portion 202*a*-4 and 202*a*-5. The spreader roller 204 may comprise any known or conventional spreader roller of any suitable type, such as a fixed bow roll, an adjustable bow roll, a concave web spreading roll, an ESR segmented expander roll, or an expander web spreading roll.

Figure 11:
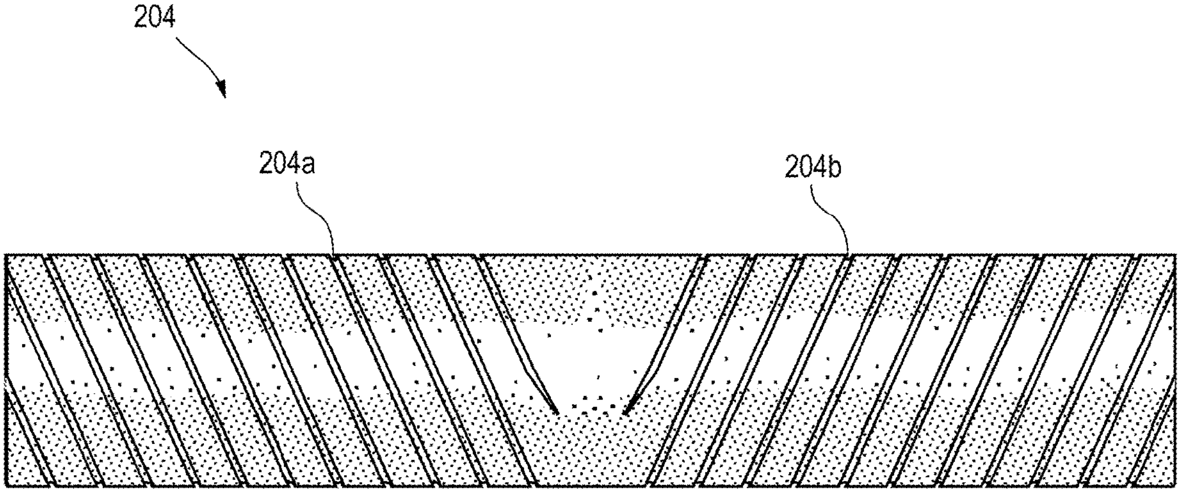
FIG. 11 is an elevational side view of the spreader roller of FIG. 10.

In the illustrated embodiment, the spreader roller 204 comprises a conventional resilient cylindrical roller with two spiral grooves 204*a* and 204*b* (FIG. 11).

Figure 7:
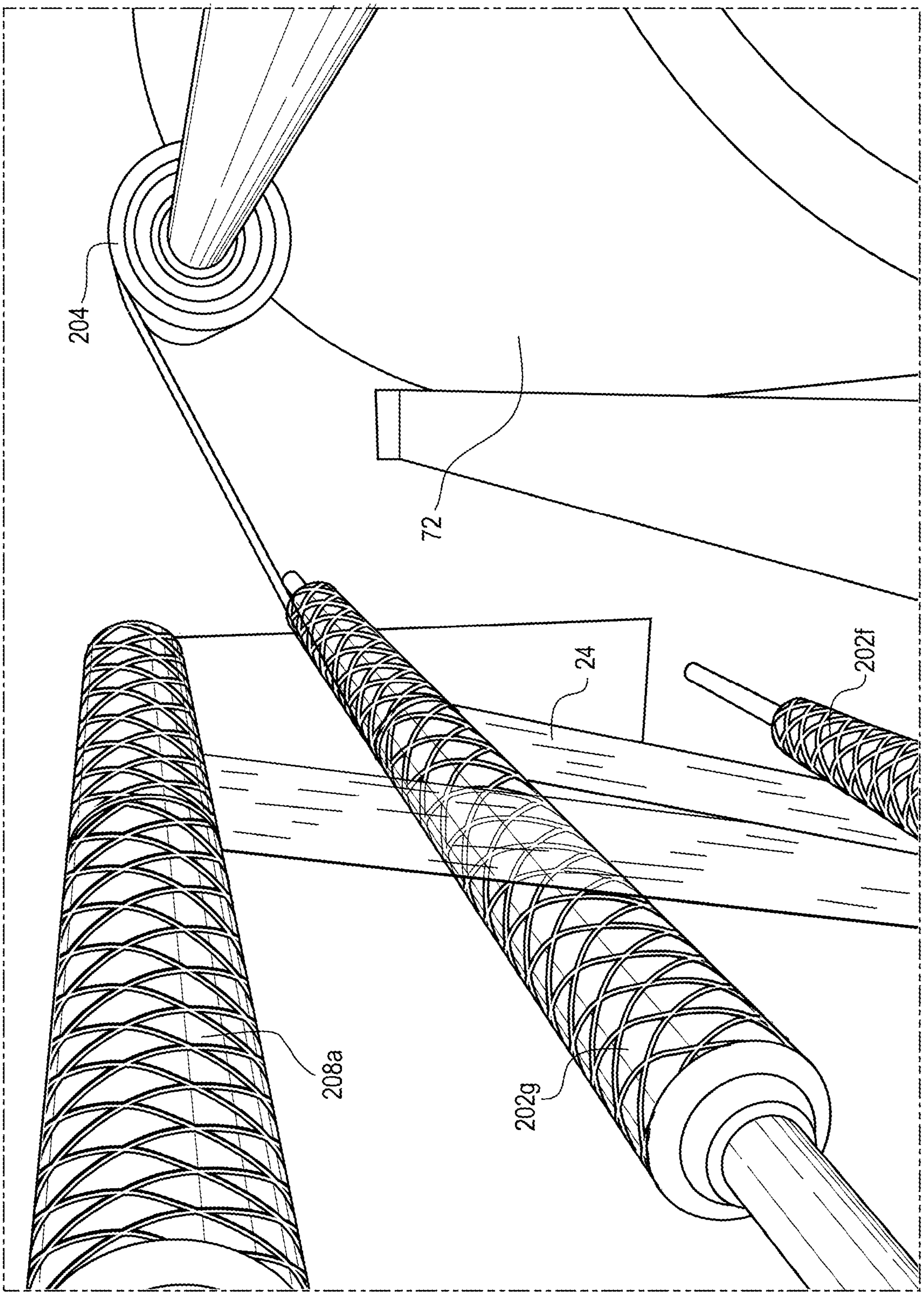
FIG. 7 is a fragmentary perspective view of the idler rollers 208*a*, 202*g*, and 202*f*, the spreader roller 204, and the drum 72 of FIG. 4.
Figure 8:
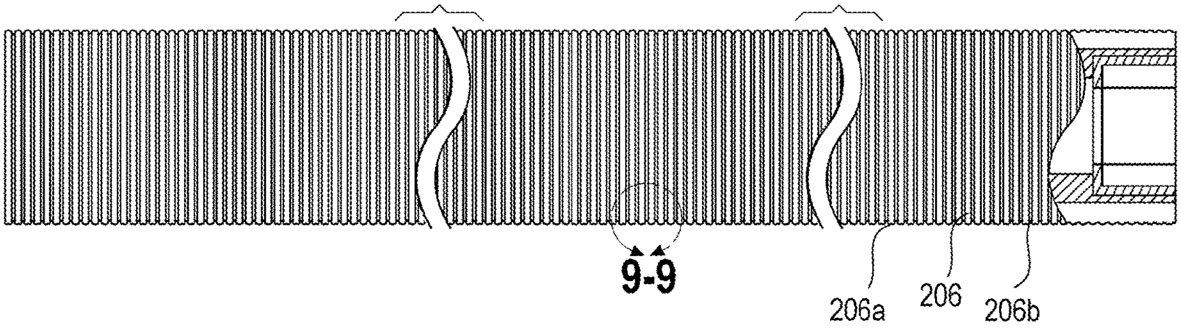
FIG. 8 is a side elevational view of the nip roller 206 used in the embodiment of FIG. 4.
Figure 9:
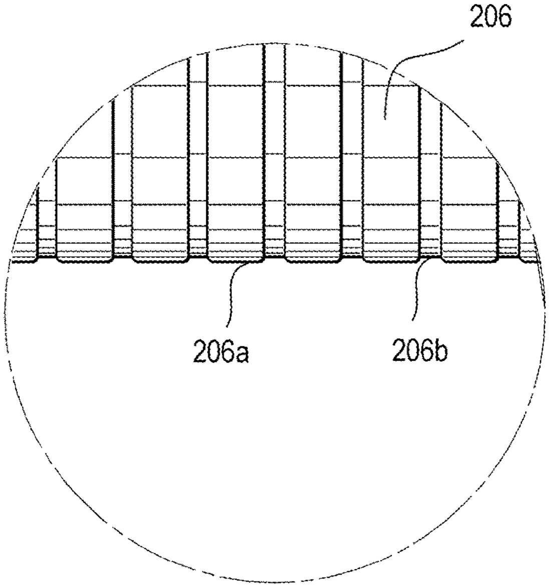
FIG. 9 is an enlarged fragmentary side elevational view of a portion of the nip roller 206 of FIG. 8.

Referring to FIGS. 7-9, the nip roller 206 is also of conventional or known design and comprises a resilient outer surface 206*a* and a plurality of grooves 206*b*. The grooves 206*b* are disposed perpendicular to a longitudinal axis of the roller 206 and are therefore parallel to one another. In the illustrated embodiment the grooves 206*b* have identical dimensions to one another and are equally spaced along the roller 206, although some or all of the grooves 206*b* may have different dimensions than some or all of the remaining grooves 206*b*. Further, in the illustrated embodiment each of the grooves 206*b* has a rectangular cross-sectional shape comprising a width parallel to the longitudinal axis of one-sixteenth of an inch, a depth of one-sixteenth of an inch, and a spacing between centers of adjacent grooves of one-quarter inch. Further, the outer surface 206*a* may be made of rubber or other suitable material. During operation, air trapped in the web 24 collects in the grooves 206*b* and passes through the nip with the drum 72 so that the air is not allowed to accumulate behind the nip and possibly stretch or burst the web 24.

Preferably, each idler roller 202 and 208 is spaced center to center from adjacent rollers 202, 204, 206, and 208 in a range between 38 to 28 inches, more preferably in a range between 36 to 30 inches, and most preferably in a range between 35 to 33 inches. Alternatively, each idler roller 202 and 208 is spaced center to center from adjacent rollers 202, 204, 206, and 208 no more than about 36 inches, and more preferably no more than about 34 inches, and most preferably less than or equal to about 30 inches so that the unsupported length of the web 24 is limited at all points in the system 200. Also, roller-to-roller alignment is precisely controlled by ensuring that the centerline of every roller 202,

204, 206, and 208 in the system is preferably aligned no more than about 0.001 inches per foot along the longitudinal axis of each roller to a selected single virtual datum point, and more preferably no more than about 0.00075 inches per foot along the longitudinal axis of each roller to a selected single virtual datum point, and most preferably less than or equal to about 0.0005 inches per foot along the longitudinal axis of each roller to a selected single virtual datum point. In addition, a spreader roller, such as the roller 204, is disposed at no greater than a particular distance before every critical nip point in the system 20. Specifically, the spreader roller 204 is preferably disposed a distance from the nip point between the nip roller 206 and the drum 72 in a range between about 6 inches to about 11 inches, more preferably in a range between about 6.5 inches and about 9.0 inches, and most preferably between about 7.0 inches and about 8.5 inches as measured between the point at which the web 24 leaves contact with the spreader roller 204 and the nip point. Alternatively, the spreader roller 204 is preferably disposed a distance from the nip point between the nip roller 206 and the drum 72 about 10 inches or less, more preferably about 8.5 inches or less, and most preferably about 7 inches or less as measured between the point at which the web 24 leaves contact with the spreader roller 204 and the nip point to maintain wrinkle free material in the nip. Thus, the system 200 may have the foregoing parameter magnitudes comprising a roller spacing between adjacent rollers of no greater than 34 inches, an alignment no greater than about 0.001 inches per foot along the longitudinal axis of each roller to a selected single virtual datum point, and a distance of no greater than about 7 inches between a spreader roller and a nip point. One might alternatively use any other combination(s) of the foregoing recited parameter magnitudes as desired, such as a roller spacing of about 36 or about 30 inches, an alignment of about 0.00075 or about 0.0005 inches per foot, and a distance of about 10 inches or about 8.5 inches between a spreader roller and a nip point.

Each element defining the ends of the tension zones comprises a nip roller as seen in FIGS. 8 and 9 adjacent a driven roll or drum. Further, with the exception of the roll 25, a spreader roller such as the one shown in FIG. 11 and/or as described above is disposed upstream of each nip at the ends of the tension zones. Also, the web 24 is supported at the spacings described above within each tension zone by idler rollers similar or identical to the rollers 202, 208.

The system 200 may also incorporate a printhead gap control system. Further, while the foregoing is effective to minimize the incidence of wrinkle formation, wrinkling might still occur and/or splices may need to be accommodated. Thus, provision is made as described below to control printhead gapping and prevent damage to one or more ink jet printheads. While the control system 222 described below is shown in connection with the imager unit 70, identical or substantially similar control systems are used in connection with the remaining imager units 30, 44, 60, and/or 82, as should be evident. If desired, elements of the various control systems may be combined and/or shared and/or the systems may be completely separate. Inasmuch as the control system 222 controls the position of sixteen printheads, and the remaining imager units use fewer heads and operate potentially at different resolutions and/or drop sizes, the control systems other than that described hereinafter must be modified to take these differences into account, as should be evident to one of ordinary skill in the art.

Figure 12:
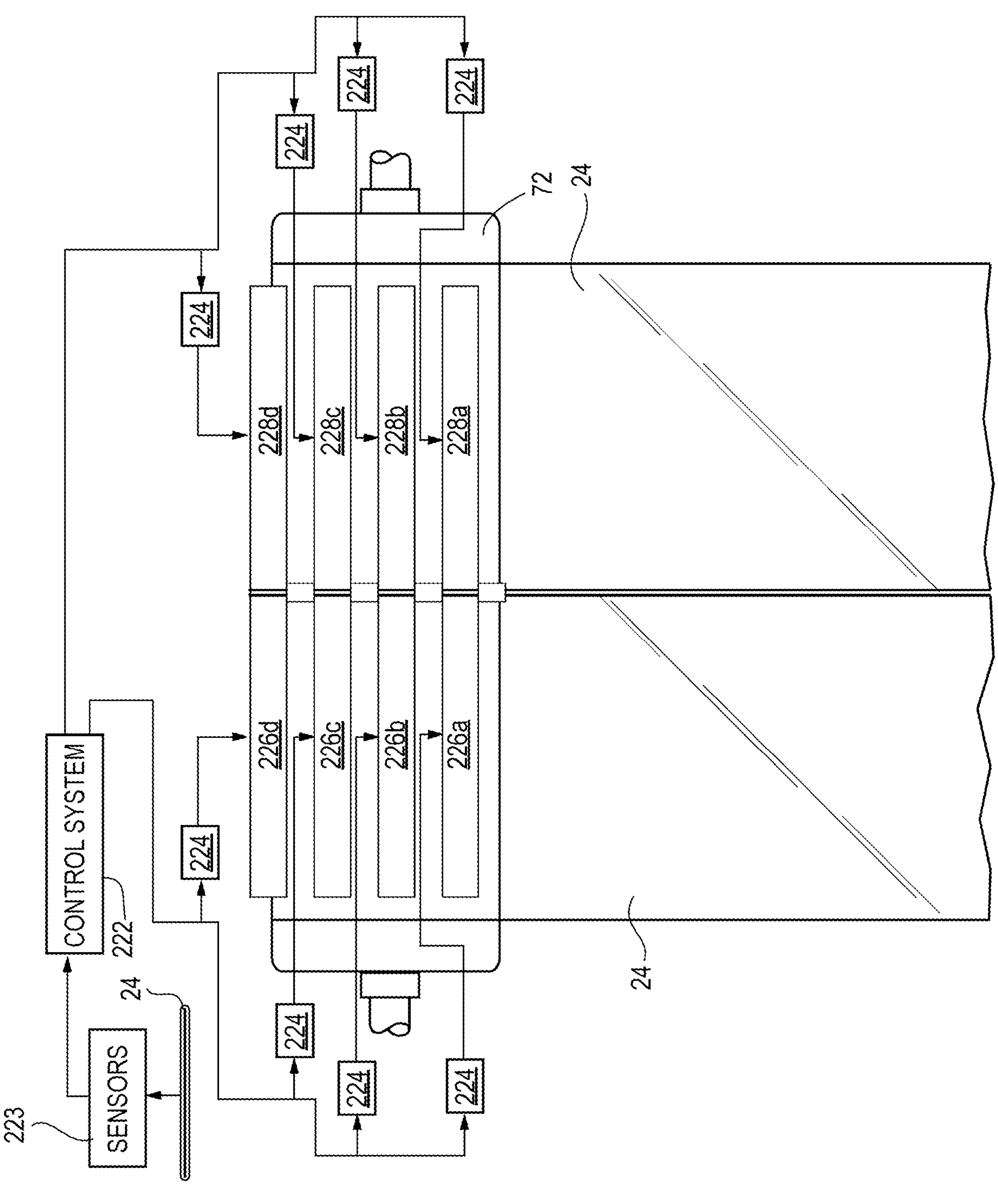
FIG. 12 is a combined fragmentary side elevational and block view of a further portion of the imager unit and control system with associated components taken generally along the lines 12-12 of FIG. 4.

As seen in FIGS. 4 and 12, a plurality of thickness sensors 223 of any suitable type senses one or more thicknesses of the web 24, for example, at spaced points along the length or width thereof. The multiple sensors 223 may instead be replaced by a single sensor, such as a CCD camera that extends across the full or partial width of the web 24, if desired. The control system 222 is responsive to the output(s) of the sensors 223 and comprises and controls a plurality of actuators 224 that control the distance of the faces of various printheads, two of which 226 and 228 are shown in generalized form in FIG. 4, eight of which 228*a*-228*h* are shown in FIG. 3, and eight of which 226*a*-226*d* and 228*a*-228*d* are shown in FIG. 12, it being understood that there are sixteen printheads in total comprising two for each of the colors CMYK and OVG and the spot color S. Specifically, with reference to FIG. 12, the printheads 226*a*, 228*a* are independently operable and disposed in side-by-side relationship to apply cyan up to the full width of the web 24, the printheads 226*b*, 228*b* are disposed in side-by-side relationship and are independently operable to apply magenta up to the full width of the web 24, and so on for the remaining printheads (as seen in FIG. 3 the printheads 226, 228 are disposed about the periphery of the drum 72 and the printheads 226, 228 for the colors OVGS are disposed behind the drum 72 of FIG. 12 and are thus not visible in such FIG.). The printhead 226 for each color is laterally directly adjacent the printhead 228 for the same color (i.e., the innermost ejection orifices or ports of the printheads 226, 228 are spaced substantially equal to the spacing between the remaining adjacent orifices or ports of the printheads 226, 228) so that a full-width web may be imaged without creating a lateral gap between the portions imaged by the printheads 226, 228 on the web 24. Further, each of the printheads 226, 228 is radially movable, preferably independently, toward and away from the drum 72, and thus, from the web 24, by the actuators 224 responsive to the sensors 223 and remainder of the control system 222. The positions of the printheads 226, 228 may be determined by sensors, such as the position sensor 229 for one or the printheads 226 (like sensors are provided to sense the positions of the remaining printheads) and the actuators 224 may be controlled in a closed-loop fashion to obtain precise positioning. The system 222 thus allows for dynamic closed-loop printhead gapping from each printhead face to the drum 72 depending on the substrate thickness based on feedback developed by the sensors 223. In this regard, a web position encoder 230, which may be an optical device, (and which may comprise the position encoder 160 or may be separate therefrom) senses the web position and/or speed, for example by detecting sense marks printed on the web 24, during movement thereof so that the printheads 226 and/or 228 are properly positioned for optimal imaging as the web thickness changes at the drum 72. If desired, the gapping of one printhead may be the same as or different than the gapping of other printhead(s). In the preferred embodiment a printhead gapping distance of about 0.0405 to about 0.052 inches for substrate thicknesses ranging from about 0.0005 to about 0.012 inches can be accommodated, although a different gapping range, and hence, substrate thickness range, might alternatively be accommodated.

The thickness sensors 223 are also capable of detecting a splice and/or wrinkles in the web 24. Alternatively, a dedicated splice/wrinkle sensor 231 (FIGS. 4 and 13) of a conventional optical or other suitable variety may be provided at any suitable point of the web travel. For example, one may sense opacity increases or ultrasonic signal attenuation from multiple layers or splicing tape. In the event that a splice or wrinkle is detected, the control system 222, in response to a signal from the sensors 223 or 231, senses the output of the web position encoder 230 and, at the appropriate time just before the splice or wrinkle reaches the drum 72, temporarily retracts all of the printheads 226, 228 so that the splice or wrinkle does not damage any of the printheads. The control system 222 moves the printheads 226, 228 back to their appropriate gapping distances once the splice or wrinkle has passed the printheads.

The control system 222 also comprises a tension control that is responsive to one or more strain gauges disposed in one or more of the rollers 202, 208 (such as a strain gauge 202*c*-1 in the roller 202*c* of FIGS. 4 and 13) and/or other rollers in other tension zones and controls the speed of one or more driven rollers in the system 20, such as a drive motor 73 (FIG. 13) that controls the movement of the drum 72 and a drive motor 233 in the third imager unit 60 that supplies motive power to a driven roller 235, to control tension in the web 24 at each tension zone, such as the sixth tension zone.

Figure 13:
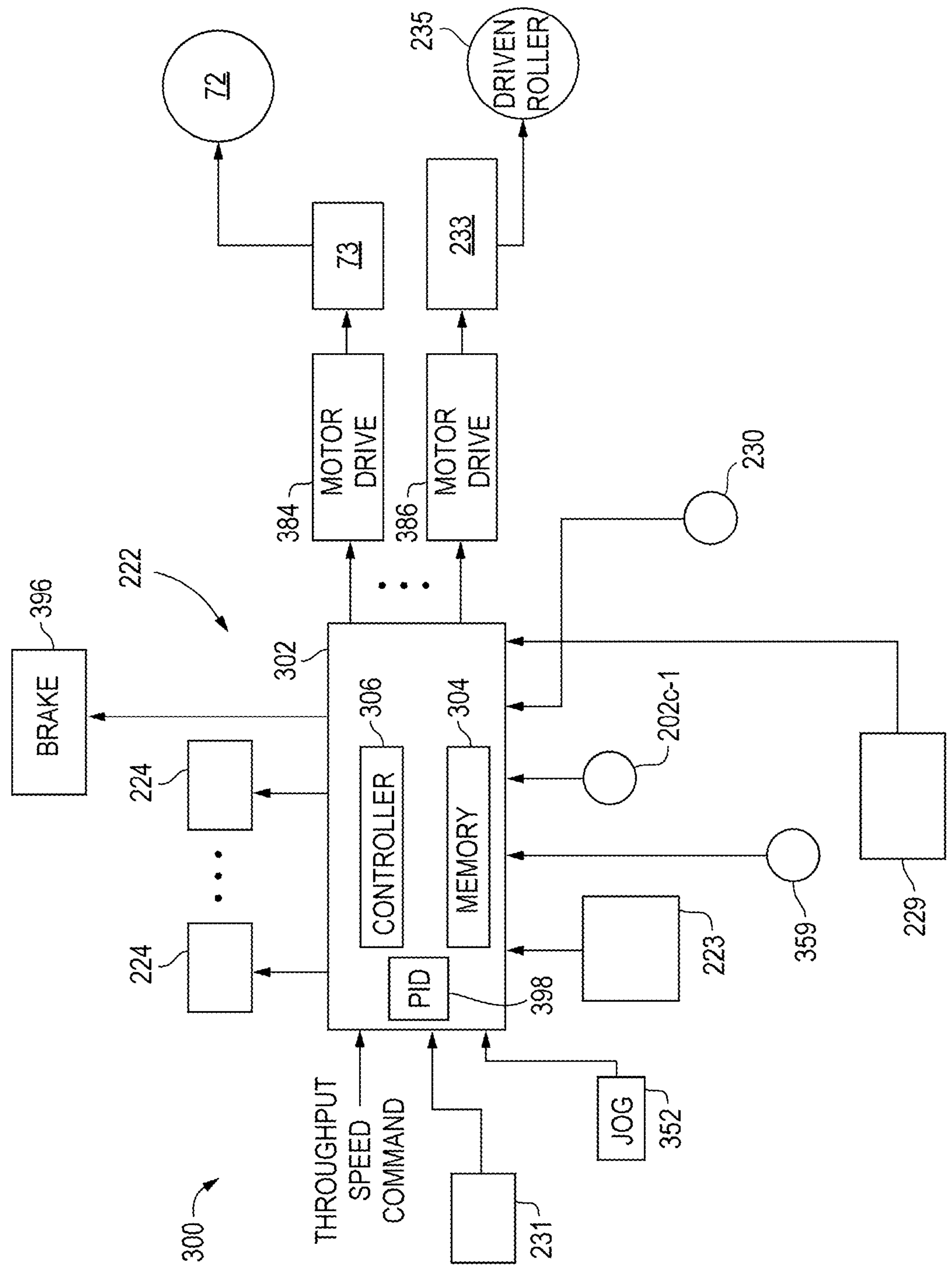
FIG. 13 is a block diagram of a computer system for implementing the control system of FIG. 4.

FIG. 13 illustrates a computer system 300 especially adapted to implement the control system 222, it being understood that any or all of the control systems disclosed herein, such as one or more of the control systems 120, 130, and/or the dryer control system(s), may be implemented by like computer systems or by the computer system 300. Thus, for example, the computer system 300 may also comprise the processing unit 152 and may implement the control system 222. The computer system 300 comprises a personal computer, server, or other programmable device 302 having a memory 304 that, among other things, stores programming executed by a processing module or controller 306 to implement the control system 222. The device 302 receives signals from the strain gauges including the strain gauge 202*c*-1, the web position encoder 230, and the sensors 223, 229, and 231 and controls the actuators 224 and the various drive motors, such as the drive motor 73 and drive motor 233 as noted below.

Figure 14:
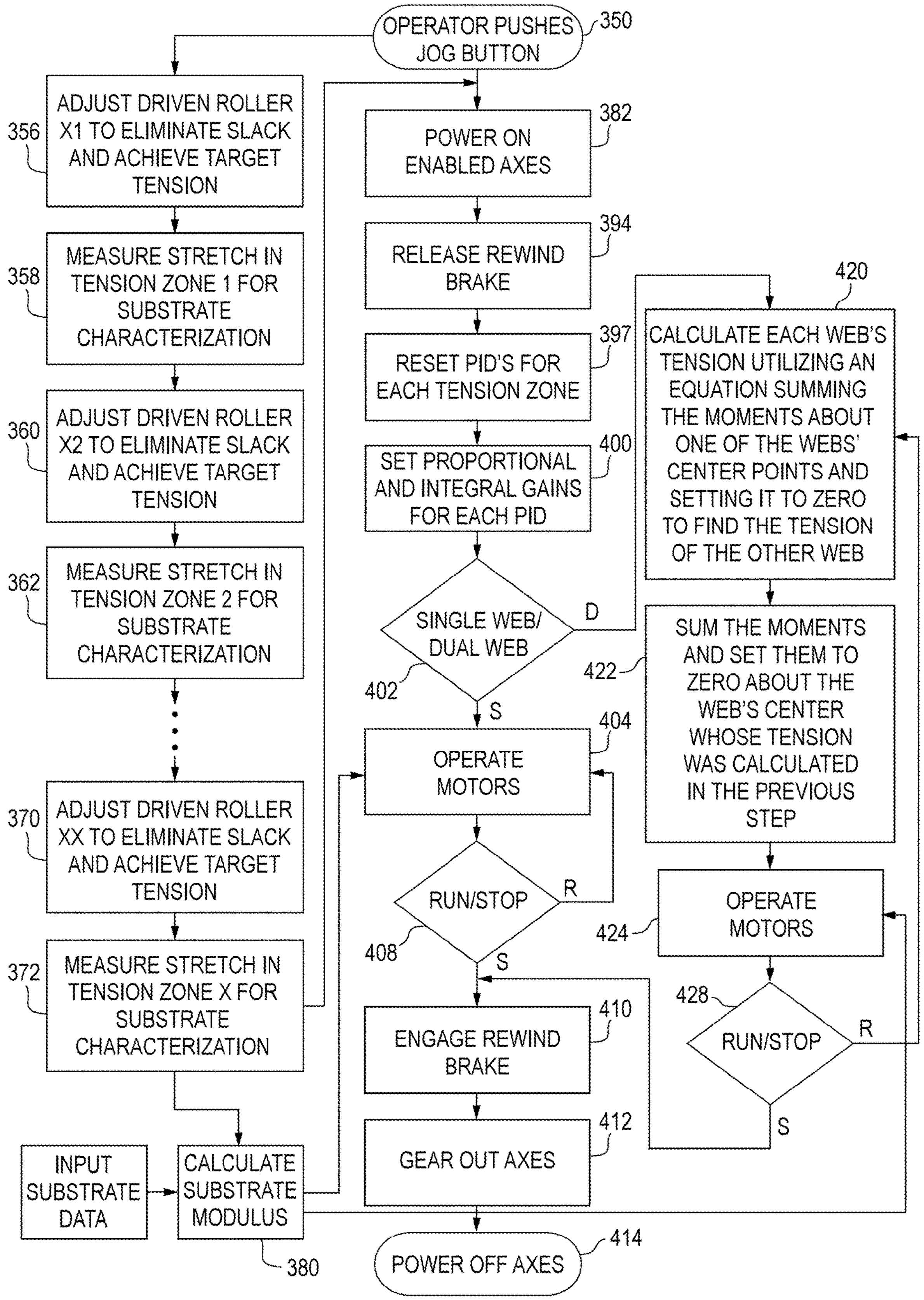
FIG. 14 is a flowchart of programming executed by the computer system of FIG. 13.

The programming illustrated in FIG. 14 is executed by the device 302 to implement the control system 222. The programming begins at a block 350 that detects when an operator has pushed a "jog" button 352 (FIG. 13) after first preloading the system 20 with the material of the web 24. In the latter regard, the web 24 is preferably loaded only through those system components that are to be active, and therefore enabled, during the pass(es) through the system 20, thereby bypassing unused system components.

Once the block 350 determines that the operator has pressed the jog button 352, control passes to a series of blocks that execute a pre-tensioning and web characterization sequence. A block 356 commands a driven roller in the first tension zone to eliminate slack in the first tension zone. Referring again also to FIG. 1, assuming that all of the components of the system 20 are enabled for use, the block 356 commands the driven roller in the pull module 22 to rotate until a target tension in the first tension zone is achieved, at which point the driven roller is maintained at such position. A block 358 then measures the stretch in the first tension zone so as to obtain a characterization of the substrate in the first tension zone. The stretch is calculated by the block 358 (and by subsequent blocks) using roller encoders disposed in idler rollers, such as a roller encoder 359 in the roller 202*c* of FIGS. 4 and 13, together with the tension sensed by one or more strain gauges in the respective tension zone, wherein the strain gauge(s) may be similar or identical to the strain gauge 202*c*-1 described above.

A block 360 identical to the block 356 commands the driven roller in the second tension zone comprising the driven roller in the first imager unit 30 to rotate and remove slack in the second tension zone until a target tension for the second tension zone is achieved. A block 362 identical to the block 358 then measures the stretching of the web 24 in the second tension zone so as to characterize the portion of the web 24 in such zone. Subsequent blocks identical to the blocks 356 and 358, such as blocks 370, 372, sequentially remove slack in the third through eighth remaining tension zones, tension the web 24 to target values, and measure stretch in each of the zones to characterize the web 24 in each of the third through eighth tension zones.

Following the block 372, a block 380 receives data concerning the substrate web 24 and calculates the modulus of elasticity of the material of the web 24. The data, which may be supplied by the operator, another person, or by indicia, such as a sensed barcode, may comprise information concerning the material of the web 24. The modulus of elasticity, the web characterization undertaken by the blocks 358, 362, 372 and corresponding blocks for other web tension zones, or both, may be used at a subsequent point in the programming as noted in greater detail hereinafter to establish PID controller parameters. Also, if the web characterization undertaken by the blocks 358, 362, 372 and corresponding blocks for other web tension zones indicates that there is a significant discrepancy between the measured characterization and the substrate data and/or the calculated substrate modulus of elasticity, action may be undertaken, such as immediately disabling the system 20, energizing a light and/or audible alarm, etc.

Also following the block 372 control pauses until the operator again presses the jog button 352 whereupon execution passes to a block 382 that initiates a production run. The block 382 supplies electrical power to the various motors and associated motor drives, such as the motor drives 384, 386 of FIG. 13.

Following the block 382, a block 394 releases a rewind brake 396 (FIG. 13) associated with the take-up roll 100 (FIG. 1). A block 397 thereafter resets proportional-integral-differential (PID) controllers 398 (FIG. 13) two of which are associated with one of the enabled tension zones. The PID controllers are implemented by the device 302. A block 400 then sets proportional and integral gains for each PID controller 398 to predetermined values.

Following the block 400, a block 402 checks to determine whether the web 24 is to be simplex printed or duplex printed. If the web is to be printed only on one side, control passes to a block 404 described in greater detail hereinafter that operates the various driven rollers for the enabled units so that a commanded system throughput is achieved. A block 408 checks to determine whether the operator has commanded that the system 20 be stopped. If not, control returns to the block 404, and control remains with the block 404 until the operator has commanded that the system 200 be stopped, whereupon control passes to a block 410.

The block 410 engages the rewind brake 396, a block 412 then slowly and in a controlled fashion reduces the speed commands for the various driven rollers in the enabled units, and a block 414 powers off the various motors to bring the web 24 to a controlled stop.

If the block 402 determines that the web is to be printed on both sides, control passes to a block 420 that sums multiple moments of inertia about a lateral centerline of a roller, such as an idler roller 202 or 208, in order to obtain an indication of the total tension developed by both webs in the tension zone in which the roller is disposed. The block 420 further sums multiple moments of inertia about a lateral centerline of a first one of the web portions supported by the roller 202 or 208 and the tension developed by a second one of the web portions is obtained by setting the latter sum of the moments calculated by the block 420 equal to zero in the determination of total tension.

A block 422 then calculates the tension in the first web by summing the moments of inertia about a lateral centerline of the second web and setting such summed moments to zero in the determination of total tension. A block 424 that is preferably identical to the block 404 operates the various driven rollers for the enabled units at proper speeds for a commanded throughput while also controlling tension in the tension zones. A block 408 then checks to determine whether the operator has commanded that the system 20 be stopped. If not, control returns to the block 420, and control remains in the loop comprising the blocks 420, 422, and 424 until the operator has commanded that the system 200 be stopped, whereupon control passes to the blocks 410, 412, and 414 so that the system 20 is brought to a controlled stop.

Figure 15:
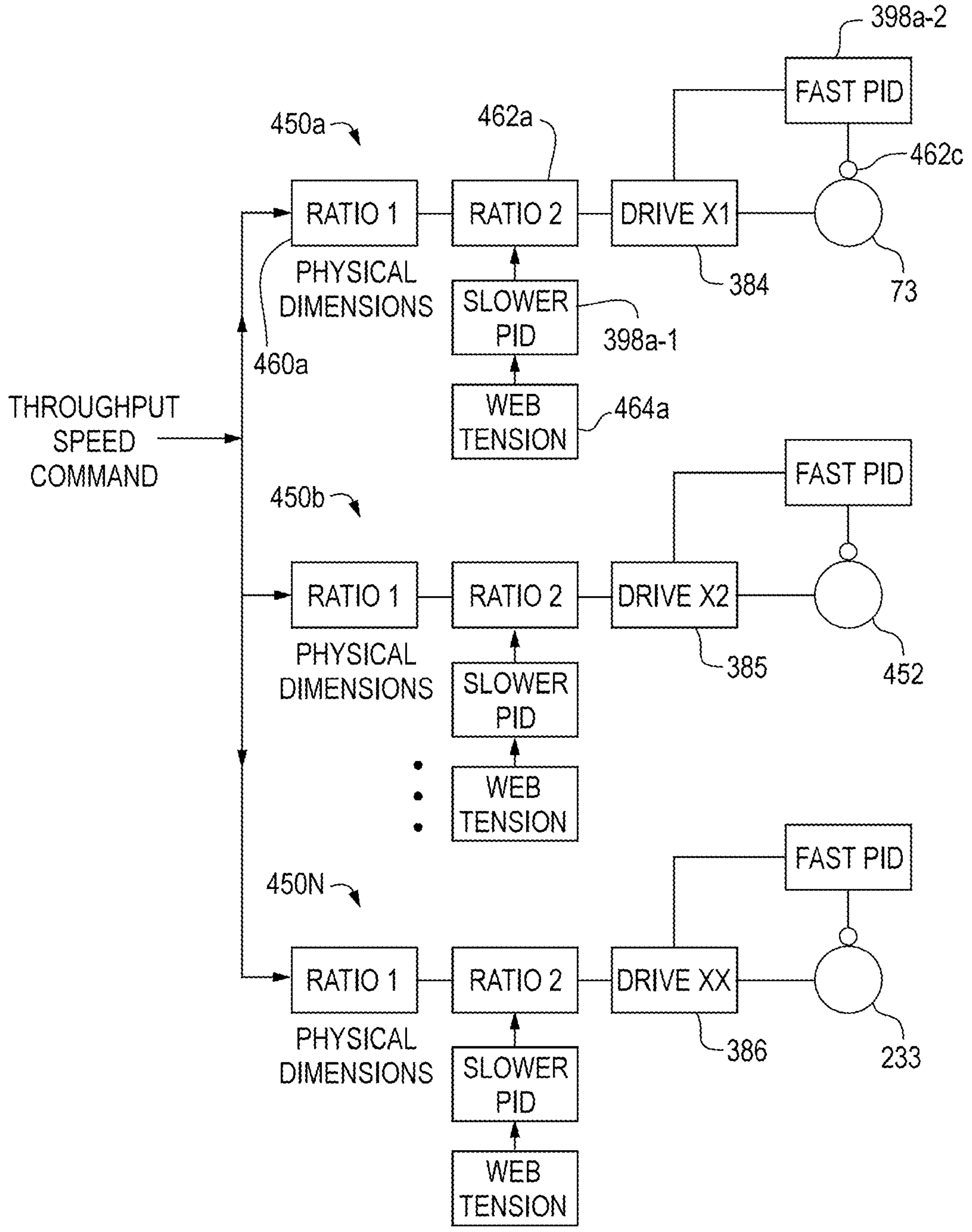
FIG. 15 is a flowchart of programming executed by the computer system together with hardware both as shown in FIG. 13 to implement each of the blocks 404 and 424 of FIG. 14.

FIG. 15 illustrates a combination of programming and hardware to implement each of the blocks 404 and 424 of FIG. 14. The programming is responsive to a throughput speed command entered by an operator (FIG. 13) to the computer system 300. The programming includes execution branches 450*a*, 450*b*, . . . , 450N that are preferably identical or similar to one another. The branch 450*a* controls, for example, the motor 73, the branch 450*b* controls a motor 452 that provides motive power to a driven roller in another tension zone, such as a driven roller in the imager unit 82 disposed in the seventh tension zone. The branch 450 N may control the drive motor 233 in the third imager unit 60. Other driven rollers are controlled by identical or similar execution branches 450.

Inasmuch as the execution branches 450 are identical or similar, only the execution branch 450*a* will be described in detail. The branch 450*a* begins at a block 460*a* that adjusts the throughput speed command by a first ratio that takes into account the diameter of the drum 72 so that the surface of the drum 72 moves at a commanded tangential speed to control web tension and system throughput. Next, a block 462*a* further modifies the speed command by a second ratio based upon a tension feedback signal developed by a tension sensor 464*a*, which may comprise one or more of the strain gauges such as the strain gauge 202*c*-1 (FIGS. 4 and 13) disposed in one or more of the rollers 202, 208, in this case, of the sixth tension zone, wherein the tension feedback signal is modified by a first one 398*a*-1 of the PID controllers 398. The resulting command signal is supplied to the motor drive 384 to operate the motor 73. A second one 398*a*-2 of the PID controllers 398 is responsive to a motor position feedback signal developed by a motor position sensor 462*c* and provides a modified feedback signal to the motor drive 384 so that the latter operates as a closed-loop controller. Significantly, the PID controller 398*a*-1 is a relatively slow controller so that tension is controlled over a relatively wide range by adjusting driven roller positions slowly.

On the other hand, the PID controller 398*a*-2 is a relatively fast-acting controller that maintains synchronized operation of the driven rollers.

It should be apparent to those who have skill in the art that any combination of hardware and/or software may be used to implement any or all of the system or components thereof described herein. It will be understood and appreciated that one or more of the processes, sub-processes, and process steps described in connection with the FIGS. may be performed by hardware, software, or a combination of hardware and software on one or more electronic or digitally-controlled devices. The software may reside in a software memory (not shown) in a suitable electronic processing component or system such as, for example, one or more of the functional systems, controllers, devices, components, modules, or sub-modules schematically depicted in the FIGS. The software memory, for example the memory 304, may include an ordered listing of executable instructions for implementing logical functions (that is, "logic" that may be implemented in digital form such as digital circuitry or source code, or in analog form such as analog source such as an analog electrical, sound, or video signal). The instructions may be executed within the processing module or controller 306 that includes, for example, one or more microprocessors, general purpose processors, combinations of processors, digital signal processors (DSPs), field programmable gate arrays (FPGAs), or application-specific integrated circuits (ASICs). Further, the block diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units.

The executable instructions may be implemented as a computer program product having instructions stored therein which, when executed by a processing module of an electronic system, direct the electronic system to carry out the instructions. The computer program product may be selectively embodied in any non-transitory computer-readable storage medium for use by or in connection with an instruction execution system, apparatus, or device, such as an electronic computer-based system, processor-containing system, or other system that may selectively fetch the instructions from the instruction execution system, apparatus, or device and execute the instructions. In the context of this document, computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access, i.e., volatile, memory (electronic); a read-only memory (electronic); an erasable programmable read only memory such as, for example, flash memory (electronic); a compact disc memory such as, for example, CD-ROM, CD-R, CD-RW (optical); and digital versatile disc memory, i.e., DVD (optical).

It will also be understood that receiving and transmitting of signals or data as used in this document means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

INDUSTRIAL APPLICABILITY

In summary, the web handling system 200 utilizes one or more precisely grooved nip rollers, multiple cross-grooved idler rollers, accurately aligned and spaced contact points throughout the entire system, and dynamic splice detection and subsequent image head retraction to minimize the possibility of wrinkle formation and damage therefrom. In addition, spreader rollers before important imaging nip points and dynamic gap and tension control also help minimize risk of system and product damage. The control system is operable to undertake closed-loop printhead gapping, splice, and/or wrinkle detection and printhead retraction to prevent printhead damage.

Also in summary, a.) tension measurements of the previous zone are used to adjust driven rollers to achieve closed loop control; b.) control calculations allow for a wide range of change but at a slower rate to build tension in the elastic plastic film; and c.) multiple PID control algorithms are used for each tension control (i.e., driven) roller comprising a first PID controller tuned to control roller positions relatively quickly to maintain synchronized movement of all rollers, and a second PID controller responsive to tension feedback for each zone that adjusts roller positions relatively slowly.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure. This written description uses examples to disclose the invention, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A web handling system, comprising:
- a plurality of cross-grooved idler rollers;
- an imaging drum;
- a nip roller adjacent the imaging drum and forming a nip therewith; and
- a spreader roller disposed between the plurality of cross-grooved idler rollers and the nip roller;
- wherein each idler roller is disposed no more than a first distance from an adjacent idler roller, spreader roller, and nip roller;
- wherein the spreader roller is disposed no more than a second distance from the nip;
- wherein the first distance is in a range of 38 to 28 inches, 36 to 30 inches, or 35 to 33 inches; and
- the second distance is in a range of 6 to 11 inches, 6.5 to 9 inches, or 7.0 to 8.5 inches.

2. The web handling system of claim 1, wherein each cross-grooved idler roller comprises two independently journaled portions.

3. The web handling system of claim 1, wherein the cross-grooved idler rollers, nip roller, and spreader roller are aligned to a datum point no greater than a particular magnitude comprising one of 0.001 inches per foot, 0.00075 inches per foot, and 0.0005 inches per foot.

4. The web handling system of claim 1, further comprising a control system responsive to a position encoder.

5. The web handling system of claim 4, wherein at least one of the imaging drum and another roller is driven and wherein the control system is further responsive to a strain gauge in an idler roller and controls a speed of the at least one of the imaging drum and the other roller.

6. The web handling system of claim 4, wherein an imager unit includes the imaging drum and at least one movable printhead movable by an actuator.

7. The web handling system of claim 6, wherein the control system is further responsive to at least one thickness sensor adapted to detect web thickness and wherein the control system operates the actuator in accordance with an output of the thickness sensor.

8. The web handling system of claim 6, wherein the control system is further responsive to at least one sensor adapted to detect a splice and wherein the control system operates the actuator in accordance with an output of the sensor.

9. The web handling system of claim 6, wherein the control system is further responsive to at least one sensor adapted to detect a wrinkle and wherein the control system operates the actuator in accordance with an output of the sensor.

10. A web handling system, comprising:
- a plurality of cross-grooved idler rollers comprising a first set of idler rollers and a second set of idler rollers;
- an imaging drum;
- a nip roller adjacent the imaging drum and forming a nip therewith;
- at least one printhead adjacent the imaging drum and movable with respect to the imaging drum;
- a spreader roller disposed between the first set of idler rollers and the nip roller;
- wherein the second set of idler rollers is disposed at a downstream location from the imaging drum;
- wherein each idler roller is disposed no more than 36 inches from an adjacent idler roller, spreader roller, and nip roller;
- wherein the spreader roller is disposed no more than 9 inches from the nip;

at least one sensor adapted to detect web thickness; and a control system responsive to the at least one sensor and adapted to move the at least one printhead.

11. The web handling system of claim 10, wherein each idler roller comprises two independently journaled portions.

12. The web handling system of claim 11, wherein the idler rollers, nip roller, and spreader roller are aligned to a datum point no greater than a particular magnitude comprising one of 0.001 inches per foot, 0.00075 inches per foot, and 0.0005 inches per foot.

13. The web handling system of claim 12, further comprising a position encoder wherein the control system is responsive to the position encoder.

14. The web handling system of claim 13, wherein at least one of the imaging drum and another roller is driven and wherein the control system is further responsive to a strain gauge in an idler roller and controls a speed of the at least one of the imaging drum and the other roller.

15. The web handling system of claim 13, wherein an imager unit includes the imaging drum and the control system operates an actuator to move at least one movable printhead.

16. The web handling system of claim 15, wherein the control system is further responsive to at least one sensor adapted to detect a splice and wherein the control system operates the actuator in accordance with an output of the sensor.

17. A web handling method, comprising the steps of:

providing a web system comprising a plurality of cross-grooved idler rollers, an imaging drum, a nip roller adjacent the imaging drum and forming a nip therewith, and a spreader roller disposed between the plurality of cross-grooved idler rollers and the nip roller, disposing each idler roller, spreader roller, and nip roller no more than a first distance from an adjacent idler roller, spreader roller, or nip roller wherein the first distance is in a range of 38 to 28 inches, 36 to 30 inches, or 35 to 33 inches;

disposing the spreader roller no more than a second distance from the nip the second distance is in a range of 6 to 11 inches, 6.5 to 9 inches, or 7.0 to 8.5 inches; and transporting a flexible web through the web system.

* * * * *